United States Patent [19]

Bamford et al.

[11] Patent Number: 5,506,940
[45] Date of Patent: Apr. 9, 1996

[54] FONT RESOLUTION METHOD FOR A DATA PROCESSING SYSTEM TO A CONVERT A FIRST FONT DEFINITION TO A SECOND FONT DEFINITION

[75] Inventors: James H. Bamford, Gaithersburg, Md.; James J. DiMare, Salem, Mass.; Jose M. Goncalves, Scarborough, Canada; James W. Morris, Boca Raton, Fla.; Michael C. Tarquinio, Rockville, Md.

[73] Assignee: International Business Machines Corporation, Armonk, N.Y.

[21] Appl. No.: 37,051

[22] Filed: Mar. 25, 1993

[51] Int. Cl.⁶ .................................................. G06K 15/00
[52] U.S. Cl. ........................................ 395/110; 395/115
[58] Field of Search .................................. 395/110, 150, 395/128, 114–116, 101

[56] References Cited

U.S. PATENT DOCUMENTS

| | | | |
|---|---|---|---|
| 4,594,674 | 6/1986 | Boulia et al. | 395/150 |
| 4,686,525 | 8/1987 | Nagata | 345/195 |
| 4,751,740 | 6/1988 | Wright | 382/1 |
| 5,167,013 | 11/1992 | Hube et al. | 395/110 |
| 5,233,683 | 8/1993 | Sasaki | 395/110 |
| 5,367,618 | 11/1994 | Ishida | 395/110 |

OTHER PUBLICATIONS

K. E. Carter, et al., "Optimize Horizontal Accuracy When Processing Typographic Proportional Fonts," IBM Technical Disclosure Bulletin, Jun. 1991, pp. 272–273.
C. L. Peek, "Local Printing of Host Processed Text," IBM Technical Disclosure Bulletin, Feb. 1988, p. 408.

*Primary Examiner*—Raymond J. Bayerl
*Assistant Examiner*—Tracy M. Legree
*Attorney, Agent, or Firm*—Jonathan E. Jobe, Jr.

[57] ABSTRACT

An improved font resolution method is disclosed for a data processing system, which enables the translation of an originally defined font for a document, into available fonts in a local data processing system where the document is to be displayed or printed. The method allows for the selective substitution by a user of alternate Code Page Names and Character Set Names for fonts which may be available on a local data processing system.

2 Claims, 7 Drawing Sheets

FIG. 1A

| CODED FONT MEMBER NAME (8 bytes) (k) (m) | CODE PAGE MEMBER NAME (8 bytes) (v) (m) | CHARACTER SET MEMBER NAME (8 bytes) (v) (m) |
|---|---|---|

FIG. 1B

| CODE PAGE GLOBAL ID (CPGID) (5 bytes) (k) (d) | CODE PAGE MEMBER NAME (8 bytes) (v) (m) | GRAPHIC CHARACTER SET GLOBAL ID (GCSGID) (5 bytes) (v) (d) | WRITING STYLE / ALPHABET FLAG (1 byte) (v) (w/a) |
|---|---|---|---|

FIG. 1C

| FONT GLOBAL ID (FGID) (5 bytes) (k) (d) | AVERAGE CHARACTER WIDTH (optional) (5 bytes) (k) (d) | GRAPHIC CHARACTER SET GLOBAL ID (GCSGID) (5 bytes) (k) (d) | OPTIONAL FONT MODIFIERS (10 bytes) (k) (ofm) |
|---|---|---|---|
| WRITING STYLE / ALPHABET FLAG (1 byte) (k) (w/a) | CHARACTER SET MEMBER NAME (8 bytes) (v) (m) | | |

FIG. 1D

| "PRIMARY" CODE PAGE MEMBER NAME (8 bytes) (k) (m) | "ALTERNATE" CODE PAGE MEMBER NAME #1 (8 bytes) (v) (m) | "ALTERNATE" CODE PAGE MEMBER NAME #2 (8 bytes) (v) (m) | (. . .) |
|---|---|---|---|

FIG. 1E

| "PRIMARY" CHARACTER SET MEMBER NAME (8 bytes) (k) (m) | "ALTERNATE" CHARACTER SET MEMBER NAME #1 (8 bytes) (v) (m) | "ALTERNATE" CHARACTER SET MEMBER NAME #2 (8 bytes) (v) (m) | (. . .) |
|---|---|---|---|

{ CPGID=(4x)            }
{ GCPGID=(4x)           }
{ GCPID=(4x)            }
{ CPID=(4x)             }
{ CODEPAGEID=(4x)       }

{ FGID=(4x)             }
{ FONTID=(4x)           }
{ FNTID=(4x)            }
{ GFGID=(4x)            }
{ GFID=(4x)             }
{ FID=(4x)              }

{ CHARACTERWIDTH=(4x)   }
{ CHARWIDTH=(4x)        }
{ CHWID=(4x)            }
{ CHWI=(4x)             }
{ CW=(4x)               }

| TABLE ENTRY # | DATA FOR TABLE ENTRY |
|---|---|
| 1 | GRID=FFFF01F40055FFFF TO GRID=07E701F400420078 |
| 2 | CPNAME=T1D0BASE CHARSETNAME=C0S0PR10 REPL FONTNAME=X0GT10 |
| 3 | FONTNAME=X0PR15 NEW GRID=073701F400550078 |
| 4 | GRID=07E701F40042FFFF BY CSNAME=C0D0GT12 CODEPAGENAME=T1V10500 |
| 5 | CSNAME=C0D0GT20 CPNAME=T1V10202 TO CPNAME=T1V10275 CSNAME=C0D0GT20 |

FONT RESOLUTION METHOD FOR A DATA PROCESSING SYSTEM TO A CONVERT A FIRST FONT DEFINITION TO A SECOND FONT DEFINITION

BACKGROUND OF THE INVENTION

1. Technical Field

The invention disclosed broadly relates to data processing systems and methods and more particularly relates to the resolution of diverse font definitions for the printing or display of stored document text.

2. Background Information

FONTs are used to print or display character data using a combination of metrics (size and positioning data) and raster patterns (shape and density of blackness). Each specific FONT is uniquely defined by a specific combination of a Code Page and a Character Set. A Code Page equates specific characters (hexadecimal values) to unique Character Identifications. A Character Set equates those same Character Identifications to specific metrics and raster patterns. Each Code Page and each Character Set is stored as a member in a Font Library. The name of each such member is the name of the respective Code Page or Character Set.

The Font Library may also contain members called Coded Fonts. Each Coded Font contains the name of one Code Page and one Character Set, which, in combination, define a specific FONT. The name of each Code Font member is the name of the Coded Font.

Within the Mixed Object Document Content Architecture (MO:DCA), a FONT is specified by a Map Coded Font (MCF) structure, of which there are two (2) formats, one of which is obsolete but is still supported for compatibility in some implementations. Depending on which of the MCF formats is used and which of the optional data and fields are utilized within the format used, a specific FONT can be specified by any one of the following (sets of) values:

1. Coded Font Name; or
2. Code Page Name AND Character Set Name; or
3. Global Resource ID (GRID), in combination with any of the following Optional Font Modifiers which may be supplied:
   a) Font Weight Class value—specifies character stroke thickness;
   b) Font Width Class value—specifies character width-to-height ratio;
   c) Italics Characters indicator;
   d) Underscored Characters indicator;
   e) Outline Characters indicator;
   f) Overstruck Characters indicator;
   g) Proportionally Spaced Characters indicator;
   h) Kerned Characters indicator.
   i) Character Rotation value (0, 90, 180, or 270 degrees—0 degrees assumed if not specified).

Due to the methods by which these values are specified within the MCF formats, it is possible that more than one of the above values may be specified.

The Global Resource ID (GRID) is an eight byte, hexadecimal value which is composed of four (4) two byte, hexadecimal values, as follows:

1. Code Page Global ID (CPGID)
2. Graphic Character Set Global ID (GCSGID)
3. Font Global ID (FGID)
4. Average Character Width (in units of 1/1440 inch)

OBJECTS OF THE INVENTION

It is an object of the invention to provide a consistent methodology for mapping MO:DCA Map Coded Font data to Code Page and Character Set member names.

It is another object of the invention to provide a means to allow the user to customize the operation of the font mapping algorithm as desired.

It is another object of the invention to provide a means to allow the user to extend the operation of the font mapping algorithm to support additional Code Page and Character Set members which may be developed by the user or purchased from third-party sources.

It is the further object of the invention to allow the user to define Code Page and Character Set members, available in the user's Font Library, which can be used as substitutes for non-available Code Page and Character Set members specified in MO:DCA documents which the user desires to process.

It is the further object of the invention to provide the user with a method for "replacing" any specific font specification value with any desired font specification value.

SUMMARY OF THE INVENTION

These and other objects, features and advantages are accomplished by the invention. The invention is a font resolution method for a data processing system which converts a first font definition into a second font definition for the display or printing of a stored document text. The method includes the step of extracting a map coded font structure from a mixed object document content architecture document (MODCA). The map coded font structure is then parsed and the parse names are matched against a stored font substitution table. This will generate an initial Code Page name and an initial Character Set name. If the first match is not successful, then a second matching operation is performed which matches the parse names against stored data interpretation tables. This will generate an initial Code Page name an initial Character Set name. The initial Code Page name and Character Set name are then searched in a Font Library and if they are found, then working Code Page name and Character Set names are output for the display and/or printing of the document. However, if the parse names are not found in the data interpretation tables, then the method looks up alternate Code Page names and alternate Character Set names in the data interpretation tables and finds the best match as has been selected by the user. The best user selected match is then output as the working Code Page name and Character Set name to display and/or print the document.

DESCRIPTION OF THE FIGURES

These and other objects, features and advantages will be more fully appreciated with reference to the accompanying figure.

FIG. 1A illustrates the data structure for Data Interpretation Table 1 (CODED FONT MEMBER NAME to CODE PAGE MEMBER NAME and CHARACTER SET MEMBER NAME).

FIG. 1B illustrates the data structure for Data Interpretation Table 2 (CODE PAGE GLOBAL ID (CPGID) to CODE PAGE MEMBER NAME, GRAPHIC CHARACTER SET GLOBAL ID (GCSGID), and WRITING STYLE/ALPHABET FLAG).

FIG. 1C illustrates the data structure for Data Interpretation Table 3 (FONT GLOBAL ID (FGID), AVERAGE CHARACTER WIDTH, GRAPHIC CHARACTER SET GLOBAL ID (GCSGID), OPTIONAL FONT MODIFIERS, and WRITING STYLE/ALPHABET FLAG to CHARACTER SET MEMBER NAME).

FIG. 1D illustrates the data structure for Data Interpretation Table 4 (CODE PAGE MEMBER NAME to ALTERNATE CODE PAGE MEMBER NAMEs).

FIG. 1E illustrates the data structure for Data Interpretation Table 5 (CHARACTER SET MEMBER NAME to ALTERNATE CHARACTER SET MEMBER NAMEs).

FIG. 3 is a sample Font Substitution Table as it might have been prepared by the user. This sample table will be used in the examples.

DISCUSSION OF THE PREFERRED EMBODIMENT

Figures 1, 1F:
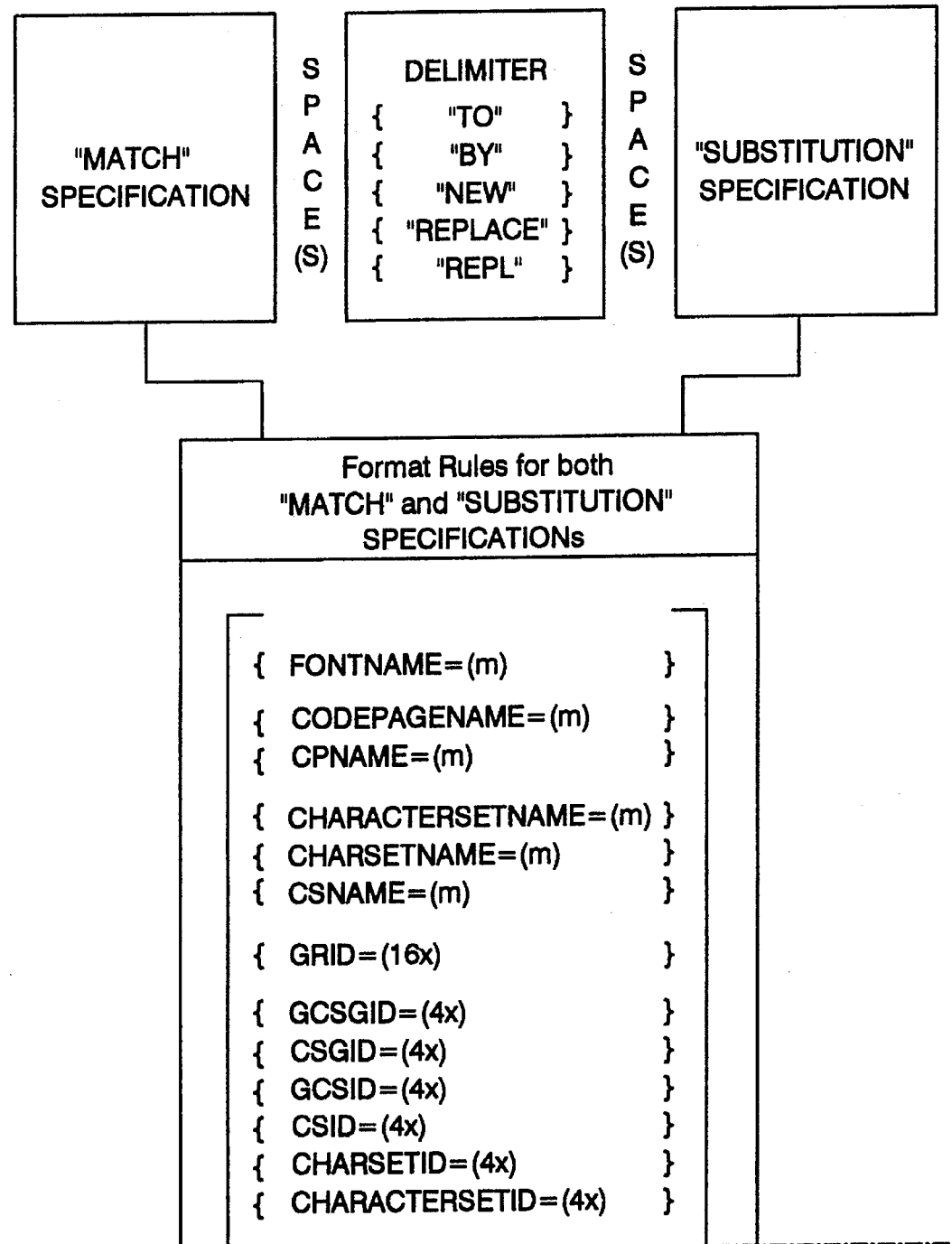
FIG. 1F illustrates the data structure for the Font Substitution Table.

The invention is a consistent method for mapping MO:DCA Map Coded Font data to Code Page and Character Set member names. It enables the user to have complete control of the specifics of the operation of the method, including adding support for user-developed and third-party fonts, as well as customizing the operation as appropriate to the user's situation.

The invention uses five (5) standard data interpretation tables which may be modified/extended by the user, plus one, optional, Font Substitution Table, which may be developed by the user if desired. FIGS. 1A–1F illustrate the data structures for the data interpretation tables and the FONT Substitution Tables which will be described in greater detail below. The five standard data interpretation tables are:

1) CODED FONT MEMBER NAME to CODE PAGE MEMBER NAME and CHARACTER SET MEMBER NAME.

This table serves the same purpose as the Coded Font members in the Font Library. This table provides support for Coded Font names for which corresponding Coded Font members may not exist in the Font Library. FIG. 1A illustrates the data structure for Table 1. This table data was compiled from various sources of IBM published Coded Font data.

2) CODE PAGE GLOBAL ID (CPGID) to CODE PAGE MEMBER NAME, GRAPHIC CHARACTER SET GLOBAL ID (GCSGID), and WRITING STYLE/ALPHABET FLAG.

The purpose of this table is to provide a conversion from the CPGID portion of a GRID (Global Resource ID) to a Code Page Member Name and the Writing Style (or Alphabet) associated with that Code Page. In addition, if there is a GCSGID (Graphic Character Set Global ID) associated with the Code Page, the table entry will provide that GCSGID as well. FIG. 1B illustrates the data structure for Table 2. This table data was compiled from various sources of IBM published Code Page data.

3) FONT GLOBAL ID (FGID), AVERAGE CHARACTER WIDTH, GRAPHIC CHARACTER SET GLOBAL ID (GCSGID), OPTIONAL FONT MODIFIERS, and WRITING STYLE/ALPHABET FLAG to CHARACTER SET MEMBER NAME.

FIG. 1C illustrates the data structure for Table 3. This table data was compiled from various sources of IBM published Character Set data. In addition, certain "intuitive" variations on the rigorously defined relationships have been included in the table. For an example of such an "intuitive" variation, assume that FGID "9993" defines Character Set "C0000001" (a "plain" font style) and that FGID "9994" defines Character Set "C0000002" (a "bold" version of Character Set "C0000001"). The "intuitive" variation would then be to specify FGID "9993" with a "BOLD" Font Modifier as defining Character Set "C0000002." Such "intuitive" variations may be used, extended, or discarded at the customer's option. An exhaustive compilation of such "intuitive" variations has not been attempted.

The Optional Font Modifiers have been presented in the table in a "structured" fashion for ease of viewing, but this is not required. Inconsistent flags on a single table entry (i.e. both BOLD and LIGHT, or both CONDENSED and EXPANDED) will cause that table entry to be ignored.

4) CODE PAGE MEMBER NAME to ALTERNATE CODE PAGE MEMBER NAME(s).

The purpose of this table is to provide a list of one or more Code Page Member Names which may be "acceptable" substitutes in the event that the desired Code Page is not available in the Font Libraries supplied. When more than one Alternate Code Page Member Names are supplied, there is an implicit priority to the order in which the Alternate Code Page Member Names are listed. All Alternate Code Page Member Names for a single "primary" Code Page Member Name must be listed on a single table entry. The number of "alternate" Code Page Member Names on a single table entry is limited only by requirements of the implementing system. FIG. 1D illustrates the data structure for Table 4. This table data was compiled on a "best efforts" basis and is provided "as is." The ultimate determination as to what is an "acceptable" substitution is a customer decision based on the customer's knowledge of the data to be processed. Therefore, this table data may be used, extended, or discarded at the customer's option.

5) CHARACTER SET MEMBER NAME to ALTERNATE CHARACTER SET MEMBER NAME(s).

The purpose of this table is to provide a list of one or more Character Set Member Names which may be "acceptable" substitutes in the event that the desired Character Set is not available or is otherwise unusable (i.e. incorrect resolution, incorrect Bounded/Unbounded Box format, etc.) in the Font Libraries supplied. When more than one Alternate Character Set Member Names are supplied, there is an implicit priority to the order in which the "alternate" Character Set Member Names are listed. All Alternate Character Set Member Names for a single "primary" Character Set Member Name must be listed on a single table entry. The number of Alternate Character Set Member Names on a single table entry is limited only by requirements of the implementing system. FIG. 1E illustrates the data structure for Table 5. This table data was compiled on a "best efforts" basis and is provided "as is." The ultimate determination as to what is an "acceptable" substitution is a customer decision based on the customer's knowledge of the data to be processed. Therefore, this table data may be used, extended, or discarded at the customer's option.

FIG. 1A is a data structure for Data Interpretation Table 1. It provides coded font member name to code page member name and character set member name. FIG. 1B is a data structure for Data Interpretation Table 2. It provides code page global ID (CPGID) to code page member name, graphic character set global ID (GCSGID), and writing style/alphabet flag. FIG. 1C is a data structure for Data Interpretation Table 3. It provides font GLOBAL ID (FGID), average character width, graphic character set global ID (GCSGID), optional font modifiers, and writing style/alphabet flag to character set member name. This table provides multiple mappings from the FGID portion of a GRID (Global Resource ID), in combination with other variables, to a Character Set member name. These mappings, in the order of priority in which they will be used, are:

a) FGID (from GRID)
  Average Character Width (from GRID)
  GCSGID (from GRID, if not Default Indicator)
  Optional Font Modifiers (from MCF)
b) FGID (from GRID)
  Average Character Width (from GRID)
  GCSGID (from GRID, if not Default Indicator)
c) FGID (from GRID)
  Average Character Width (from GRID)
  GCSGID (from Table 2, if present)
  Optional Font Modifiers (from MCF)
d) FGID (from GRID)
  Average Character Width (from GRID)
  GCSGID (from Table 2, if present)
e) FGID (from GRID)
  Average Character Width (from GRID)
  Writing Style/Alphabet (from Table 2)
  Optional Font Modifiers (from MCF)
f) FGID (from GRID)
  Average Character Width (from GRID)
  Writing Style/Alphabet (from Table 2)

As can be seen from the above, GCSGID and Writing Style/Alphabet are used in a mutually exclusive fashion. Therefore, the same table entry should NOT contain both GCSGID and Writing Style/Alphabet. Should both be specified on the same table entry, Writing Style/Alphabet will be ignored. FGID, Average Character Width, and GCSGID are decimal values.

If Average Character Width from the GRID is the Default indicator (X"FFFF"), it will be considered to match table entries which have blanks in the Character Width field. Such table entries with blanks in the Character Width field logically should only exist in those cases where there is only a single feasible character width which could be selected for the FGID and other variable values.

FIG. 1D is a data structure for Data Interpretation Table 4. It provides code page member name to alternate code page member name(s). FIG. 1E is a data structure for Data Interpretation Table 5. It provides character set member name to alternate character set member name(s). FIG. 1F is a data structure for Font Substitution Table. Both the match and substitution segments must consist of one and only one of the following:

a) A Font Member Name;
b) A Code Page Member Name AND a Character Set Member Name; or
c) A GRID (which includes as a subset any or all of GCSGID, CPGID, FGID, and Character Width).

Figure 2A:
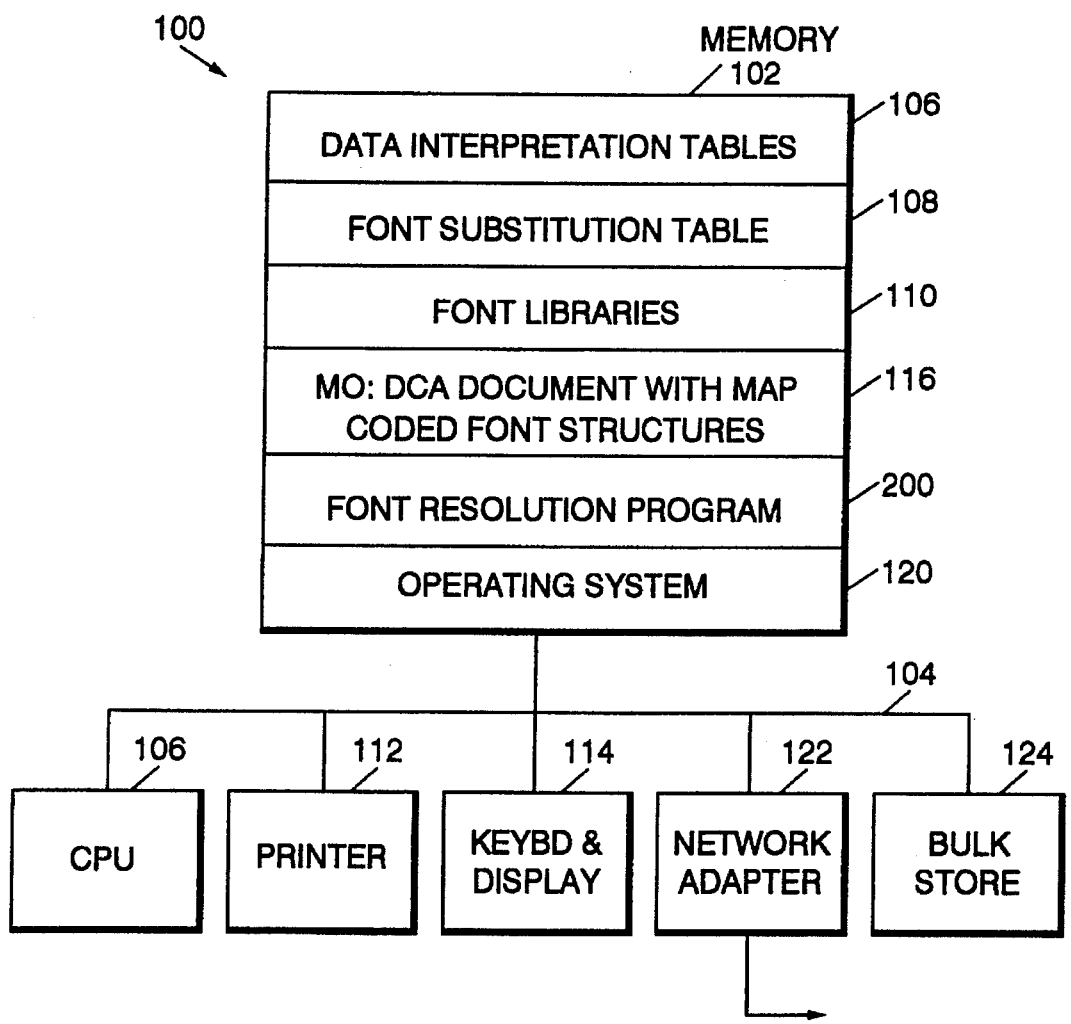
FIG. 2A is an architectural diagram of a data processing system which executes the method of the invention.

Footnotes (for FIG. 1A–1F):

(k)—data value is (one of) the key(s) to the table.
(v)—data value is (one of) the table lookup value(s) of the table.
(d)—5 digit decimal value.
(m)—must conform to Font Library member naming standards.
(x)—a number of hexadecimal characters (0–9 or A–F) as indicated by the number preceding the "x" within the parentheses.
(w/a)—the Writing Style/Alphabet Flags are:
  S—SYMBOL SET
  1—LATIN 1
  2—LATIN 2/3/5
  G—CYRILLIC GREEK
  A—ARABIC
  H—HEBREW
  Z—THAI
  D—DBCS
(ofm)—the Optional Font Modifiers flags are:
  B—BOLD (mutually exclusive with "LIGHT")
  L—LIGHT (mutually exclusive with "BOLD")
  C—CONDENSED (mutually exclusive with "EXPANDED")
  E—EXPANDED (mutually exclusive with "CONDENSED")
  I—ITALIC
  K—KERNED
  P—PROPORTIONAL
  T—OUTLINE
  U—UNDERSCORED
  V—OVERSTRUCK FIG. 2A is an architectural diagram of a data processing system which will carry out the method of the invention. FIG. A shows a data processing system 100 which includes a memory connected over a bus 104 to a central processing unit 106. The memory 102 contains data tables, text documents, and a program and an operating system. The data interpretation tables 106 are stored in the memory 102 and are described in further detail below. The FONT Substitution Table 108 is also stored in memory 102 and is also further described below. The FONT Libraries 110 are stored in the memory 102 and define the Code Page and Character Set information which characterizes each of several display and printer fonts which are capable of being produced by the printer 112 and the display 114 in the data processing system 100. A mixed object document content architecture (MODCA) document is stored in partition 116 of memory 102, which includes a map coded font structure. Map coded font structures have been previously described above.

Figure 2B:
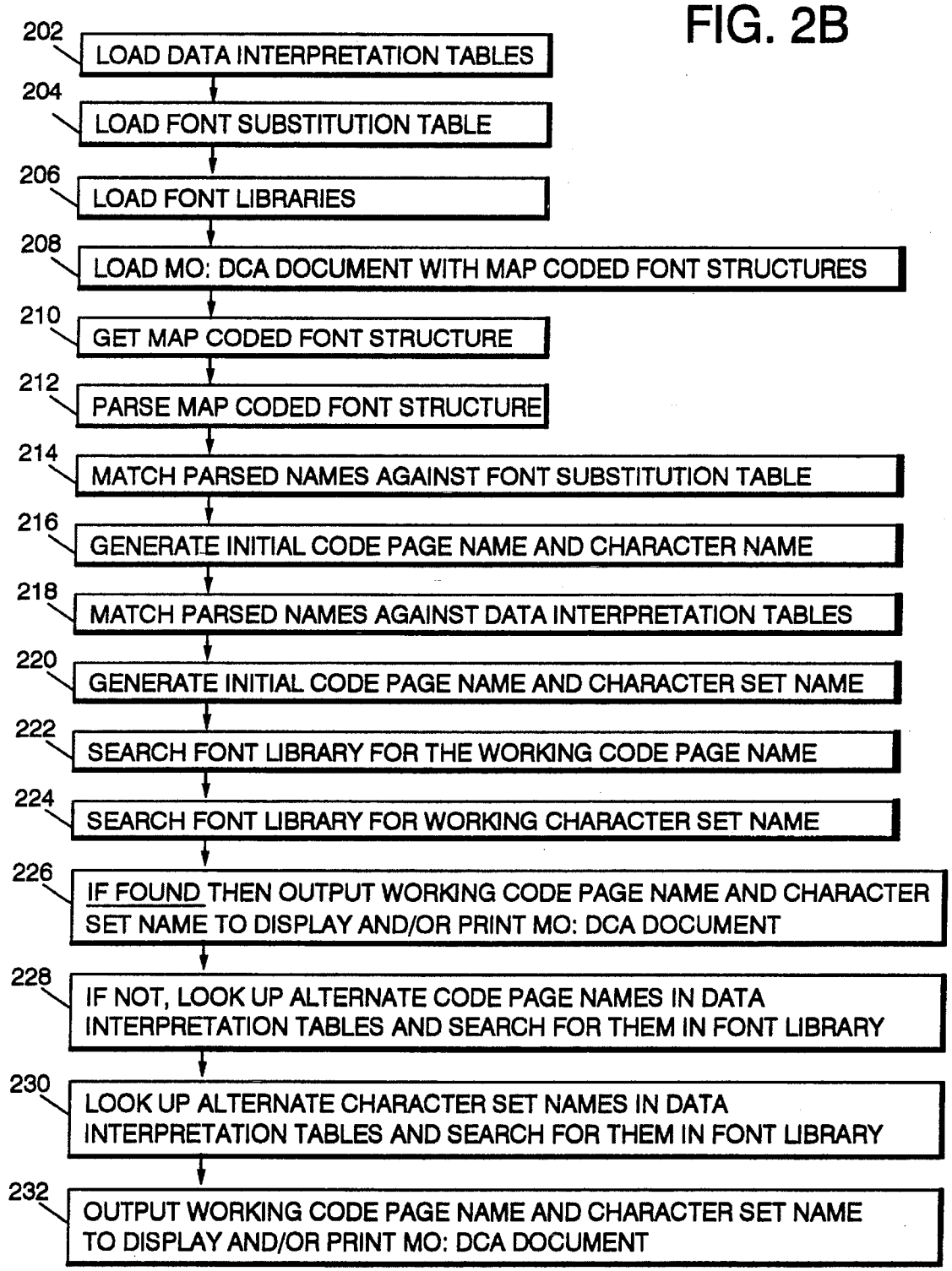
FIG. 2B is a flow diagram of a sequence of operational steps which represents a computer program for the font resolution method, in accordance with the invention.

In accordance with the invention, a FONT Resolution program 200 is stored in the memory 102, which is a sequence of stored program instructions which, when executed by the CPU 106, carries out the method of the invention as is depicted in the flow diagram of FIG. 2B. Also included in the memory 102 is the operating system 120.

Also shown in the architectural diagram of FIG. 2A, is a communications adapter 122 which couples the data processing system 100 through a local area network or other data communications link to other sources of documents and information and other destinations for the transmission of documents and information. Also shown in FIG. 2A is a bulk storage device 124 which can be for example a magnetic disk drive, an optical disk storage device, or other bulk storage device.

FIG. 2B shows a flow diagram of a sequence of operational steps which carries out the FONT Resolution method 200 in accordance with the invention. A sequence of program instructions embodying the flow diagram of FIG. 2B, is stored in the memory 102 of the system 100 of FIG. 2A.

The method 200 of FIG. 2B begins with step 202 which loads the data interpretation tables into the partition 106 of memory 102. Then step 204 loads the FONT Substitution Table into the partition 108 of memory 102. Then step 206 loads the FONT Libraries into the partition 110 of memory 102. Then the step 208 loads the MODCA document with its map coded Font structures into the partition 116 of the memory 102.

In order to perform the transformation from the fonts specified in the map coded font structures of the MODCA document, into the fonts which are capable of being produced by the printer 112 and/or the display 114 of the system 100 of FIG. 2A, step 210 gets the map coded font structure from the MODCA document. Then, step 212 parses the map coded font structure. Then step 214 matches the parsed names against the FONT Substitution Table of partition 108 of FIG. 2A. If a match is found, then step 216 generates the initial Code Page name and the initial Character Set name. If a match is not found in the FONT Substitution Table, then step 218 matches the parsed names against the data interpretation tables of the partition 106 of FIG. 2A. Then step 220 generates the initial Code Page name and the initial Character Set name.

If, at this point in the flow diagram 200 of FIG. 2B, an initial Code Page name and an initial Character Set name have been identified, then step 222 searches the Font Library in partition 110 of FIG. 2A, for the working Code Page name and step 224 searches the Font Library for the working Character Set name. Then in step 226, if they have been found in the Font Library, the method outputs the working Code Page name and the Character Set name to the process for printing the MODCA document on the printer 112 and/or the process for displaying the MODCA document on the display 114.

However, if the working Code Page name and/or the working Character Set name have not been found in the Font Library, then step 228 looks up alternate Code Page names in the data interpretation tables in the partition 106 of FIG. 2A, and searches for the presence of the alternate Code Page names in the Font Library. Then step 230 looks up alternate Character Set names in the data interpretation tables and searches for the alternate Character Set names in the Font Library. The alternate Code Page names and alternate Character Set names are then output in step 232 to the process for printing the MODCA document on the printer 112 and/or the process displaying the MODCA document on the display 114.

If no suitable alternate Code Page name and/or Character Set name is found, then the document cannot be processed on the printer 112 or the display device 114 without some distortion in the appearance of the document.

The Font Substitution Table may be specified at the user's option. The data for the FONT Substitution Table must be totally customer developed, using the freeform linguistics noted below. FIG. 1F illustrates the data structure and coding rules for the Font Substitution Table. Standard data for the Font Substitution Table is not supplied because the only source for this table is the user. The actual Font Resolution Procedure is as follows:

STEP PROCESS

1 This procedure will be repeated for each repeating group in the Map Coded Font, Format 1 or Format 2 (MCF-1 or MCF-2).

2 The data from the MCF repeating group will be parsed into the following data fields:
 Coded Font Member Name (from MCF-1 only)
 Code Page Member Name and Character Set Member Name
 Global Resource ID (GRID) (from MCF-2 only)
 Optional Font Modifiers from Triplet "1F" (from MCF-2 only—valid only with GRID)

NOTE:
 Font Weight Class values '01', '02', and '03' will result in the "LIGHT" flag.
 Font Weight Class values '07', '08', and '09' will result in the "BOLD" flag.
 Font Width Class values '01', '02', and '03' will result in the "CONDENSED" flag.
 Font Width Class values '07', '08', and '09' will result in the "EXPANDED" flag.

3 Match the Coded Font Member Name, Code Page Member Name, Character Set Member Name, and GRID data fields against the user-defined Font Substitution Table data. If an exact match is found, replace the Coded Font Member Name, Code Page Member Name, Character Set Member Name, and GRID data fields with the specified replacement values from the matched Font Substitution Table entry.

4 If the Code Page Member Name and Character Set Member Name data fields are non-blank, non-null, and non-default indicator, go to Step 13.

5 If the Coded Font Member Name is non-blank, non-null, and non-default indicator, match the Coded Font Member Name against Table 1.
 If a match is found, move the Code Page and Character Set Member Names from the matched Table 1 table entry to the corresponding data fields and go to Step 13.
 If no match against Table 1 was found, attempt to locate a member in the JCL-supplied "FONT Libraries" with a member name equal to the Coded Font Member Name data field.
 If an appropriately named member was located in the "FONT Libraries," read and parse that member to determine the corresponding Code Page and Character Set Member Names, store the Code Page and Character Set Member Names into the corresponding data fields, and go to Step 13.
 If an appropriately named member was NOT located, ERROR (this MCF data is not resolvable).

6 Use the bytes 2–3 of the GRID (the CPGID) to perform a lookup on Table 2. If a match is found, yielding a Code Page Member Name, a Writing Style/Alphabet Flag, and (optional) GCSGID, move the Code Page Member Name to the corresponding data field, save the Writing Style/Alphabet Flag and optional GCSGID for use in Steps 7–12 and continue. Else ERROR (this MCF data is not resolvable).

7 If bytes 0–1 of the GRID (the GCSGID) are NOT X'0000' or X'FFFF', then use the bytes 4–5 of the GRID (the FGID), bytes 6–7 of the GRID (the Average Character Width), bytes 0–1 of the GRID (the GCSGID), and the Optional Modifiers from Triplet "1F" to perform a lookup on Table 3.
 NOTE:
 If Average Character Width from the GRID is the Default Indicator (X"FFFF"), it will be considered to match table entries which have blanks in the Character Width field.
 If a match is found, yielding a Character Set Member Name, store the Character Set Member Name in the corresponding data field, and go to Step 13. Else continue.

8 If bytes 0–1 of the GRID (the GCSGID) are NOT X'0000' or X'FFFF', then use the bytes 4–5 of the GRID (the FGID), bytes 6–7 of the GRID (the Average Character Width), and bytes 0–1 of the GRID (the GCSGID) to perform a lookup on Table 3.

NOTE:
If Average Character Width from the GRID is the Default Indicator (X"FFFF"), it will be considered to match table entries which have blanks in the Character Width field.
If a match is found, yielding a Character Set Member Name, store the Character Set Member Name in the corresponding data field, and go to Step 13. Else continue.

9 If a GCSGID was saved in Step 6, then use the bytes 4–5 of the GRID (the FGID), bytes 6–7 of the GRID (the Average Character Width), the saved GCSGID from Step 6, and the Optional Modifiers from Triplet "1F" to perform a lookup on Table 3.
NOTE:
If Average Character Width from the GRID is the Default Indicator (X"FFFF"), it will be considered to match table entries which have blanks in the Character Width field.
If a match is found, yielding a Character Set Member Name, store the Character Set Member Name in the corresponding data field, and go to Step 13. Else continue.

10 If a GCSGID was saved in Step 6, then use the bytes 4–5 of the GRID (the FGID), bytes 6–7 of the GRID (the Average Character Width), and the saved GCSGID from Step 6 to perform a lookup on Table 3.
NOTE:
If Average Character Width from the GRID is the Default Indicator (X"FFFF"), it will be considered to match table entries which have blanks in the Character Width field.
If a match is found, yielding a Character Set Member Name, store the Character Set Member Name in the corresponding data field, and go to Step 13. Else continue.

11 Use the bytes 4–5 of the GRID (the FGID), bytes 6–7 of the GRID (the Average Character Width), the saved Writing Style/Alphabet Flag from Step 6, and the Optional Modifiers from Triplet "1F" to perform a lookup on Table 3.
NOTE:
If Average Character Width from the GRID is the Default Indicator (X"FFFF"), it will be considered to match table entries which have blanks in the Character Width field.
If a match is found, yielding a Character Set Member Name, store the Character Set Member Name in the corresponding data field, and go to Step 13. Else continue.

12 Use the bytes 4–5 of the GRID (the FGID), bytes 6–7 of the GRID (the Average Character Width), and the saved Writing Style/Alphabet Flag from Step 6 to perform a lookup on Table 3.
NOTE:
If Average Character Width from the GRID is the Default Indicator (X"FFFF"), it will be considered to match table entries which have blanks in the Character Width field.

If a match is found, yielding a Character Set Member Name, store the Character Set Member Name in the corresponding data field, and go to Step 13. Else ERROR (this MCF data is not resolvable).

13 At this point, an "initial" "Code Page Name" and "Character Set Name" have been determined.

14 Attempt to locate a member in the supplied "Font Libraries" whose member name is the same as the "initial" "Code Page Name." If such a member is found, go to Step 17.

15 Use the "initial" "Code Page Name" to perform a lookup on Table 4. If a match is found, go to Step 16. Else ERROR (this MCF data is not resolvable).

16 Use the "alternate" "Code Page Names" from the matched entry in Table 4 IN THE ORDER THEY ARE LISTED IN THE MATCHED ENTRY. For each, attempt to locate a member in the supplied "Font Libraries" whose member name is the same as the "alternate" "Code Page Name." If such a member is found, go to Step 17. Else, proceed to process the next "alternate" "Code Page Name" from the matched table entry. If all "alternate" "Code Page Names" from the matched table entry are exhausted, ERROR (this MCF data is not resolvable).

17 Attempt to locate a member in the supplied "Font Libraries" whose member name is the same as the "initial" "Character Set Name." If such a member is found, go to Step 20.

18 Use the "initial" "Character Set Name" to perform a lookup on Table 5. If a match is found, go to Step 19. Else ERROR (this MCF data is not resolvable).

19 Use the "alternate" "Character Set Names" from the matched entry in Table 5 IN THE ORDER THEY ARE LISTED IN THE MATCHED ENTRY. For each, attempt to locate a member in the supplied "Font Libraries" whose member name is the same as the "alternate" "Character Set Name." If such a member is found, go to Step 20. Else proceed to process the next "alternate" "Character Set Name" from the matched table entry. If all "alternate" "Character Set Names" from the matched table entry are exhausted, ERROR (this MCF data is not resolvable).

20 At this point, a "working" "Code Page Name" and "Character Set Name" have been determined which identify existing members in the supplied "Font Libraries." These members can be read to determine all required font data.

EXAMPLES

There are ten examples of font resolution given herein, to show the versatility of this invention. The sample Font Substitution Table of FIG. 3 is used in some of these examples. FIG. 3 is sample data for Font Substitution Table, to be used for the examples:

| TABLE ENTRY # | DATA FOR TABLE ENTRY |
|---|---|
| 1 | GRID=FFFF01F40055FFFF TO GRID=07E701F400420078 |
| 2 | CPNAME=T1D0BASE CHARSETNAME=C0S0PR10 REPL FONTNAME=X0GT10 |

-continued

| TABLE ENTRY # | DATA FOR TABLE ENTRY |
|---|---|
| 3 | FONTNAME=X0PR15 NEW GRID=073701F400550078 |
| 4 | GRID=07E701F40042FFFF BY CSNAME=C0D0GT12 CODEPAGENAME=T1V10500 |
| 5 | CSNAME=C0D0GT20 CPNAME=T1V10202 TO CPNAME=T1V10275 CSNAME=C0D0GT20 |

The first example illustrates the resolution of a Coded Font Name which is resolved via Table 1 into a Code Page Name and Character Set Name. Both the Code Page Name and Character Set Name are assumed to exist in the Font Libraries.

The second example illustrates the resolution of a Code Page Name and Character Set Name. Both the Code Page Name and Character Set Name are assumed to exist in the Font Libraries.

The third example illustrates the resolution a Coded Font Name which is replaced by a GRID based on a Font Substitution Table entry. The GRID is resolved via Table 2 and Table 3 into a Code Page Name and Character Set Name. Both the Code Page Name and Character Set Name are assumed to exist in the Font Libraries.

The fourth example illustrates the resolution of a GRID which is resolved via Table 2 and Table 3 into a Code Page Name and Character Set. Name. The Code Page Name is assumed to exist in the Font Libraries. The Character Set Name is assumed NOT to exist in the Font Libraries, but is resolved, via Table 5, into an acceptable alternate Character Set Name which is assumed to exist in the Font Libraries.

The fifth example illustrates the resolution of a Code Page Name and Character Set Name. The Code Page Name is assumed NOT to exist in the Font Libraries, but is resolved, via Table 4, into an acceptable alternate Code Page Name which is assumed to exist in the Font Libraries. The Character Set Name is assumed to exist in the Font Libraries.

The sixth example illustrates a Coded Font Name which is not resolvable.

The seventh example illustrates a Code Page Name which is not resolvable.

The eighth example illustrates a Character Set Name which is not resolvable.

The ninth example illustrates a GRID which is not resolvable via Table 2.

The tenth example illustrates a GRID which is not resolvable via Table 3.

Example 1—A Simple Resolution of a Coded Font Name

Step 2. After parsing the data from a single repeating group of a Map Coded Font (MCF) MO:DCA structure, the following data was identified:

| CODED FONT NAME | CODE PAGE NAME | CHARACTER SET NAME | GRID |
|---|---|---|---|
| X0CE12 | — | — | — |

Step 3. The data does not match any entry in the sample Font Substitution Table in FIG. 3 so the data is not changed.

| CODED FONT NAME | CODE PAGE NAME | CHARACTER SET NAME | GRID |
|---|---|---|---|
| X0CE12 | — | — | — |

Step 4. The Code Page and Character Set Names are blank (or null), so continue to Step 5.

Step 5. The Coded Font Name matches the Table 1 entry identified in the Table 1 extracted below:

| | CODED FONT MEMBER NAME | CODE PAGE MEMBER NAME | CHARACTER SET MEMBER NAME | |
|---|---|---|---|---|
| | X0CD59 | T1V10500 | C0S0CD15 | |
| | X0CE10 | T1D0BASE | C0S0CE10 | |
| >>>> | X0CE12 | T1D0BASE | C0S0CE12 | <<<< |
| | X0CH10 | T1D0BASE | C0S0CH10 | |
| | X0CIEJ | T1V10274 | C0S0CI12 | |

Therefore, the data will be changed as follows:

| CODED FONT NAME | CODE PAGE NAME | CHARACTER SET NAME | GRID |
|---|---|---|---|
| X0CE12 | T1D0BASE | C0S0CE12 | — | and processing will continue with Step 13.

Step 13. At this point, an "initial" "Code Page Name" and "Character Set Name" have been determined as follows:

| CODED FONT NAME | CODE PAGE NAME | CHARACTER SET NAME | GRID |
|---|---|---|---|
| X0CE12 | T1D0BASE | C0S0CE12 | — |

Step 14. Assume that there is a member in the "Font Libraries" with member name "T1D0BASE". Processing will continue with Step 17.

Step 17. Assume that there is a member in the "Font Libraries" with member name "C0S0CE12". Processing will continue with Step 20.

Step 20. At this point, a "working" "Code Page Name" and "Character Set Name" have been determined which identify existing members in the supplied "Font Libraries". These members can be read to determine all required font data. The data is:

| CODED FONT NAME | CODE PAGE NAME | CHARACTER SET NAME | GRID |
|---|---|---|---|
| | T1D0BASE | C0S0CE12 | — |

Example 2—A Simple Resolution of a Code Page Name and Character Set Name

Step 2. After parsing the data from a single repeating group of a Map Coded Font (MCF) MO:DCA structure, the following data was identified:

| CODED FONT NAME | CODE PAGE NAME | CHARACTER SET NAME | GRID |
|---|---|---|---|
| — | T1D0BASE | C0S0CE12 | — |

Step 3. The data does not match any entry in the sample Font Substitution Table in FIG. 3 so the data is not changed.

| CODED FONT NAME | CODE PAGE NAME | CHARACTER SET NAME | GRID |
|---|---|---|---|
| — | T1D0BASE | C0S0CE12 | — |

Step 4. The Code Page and Character Set Names are present, so continue with Step 13.

Step 13. At this point, an "initial" "Code Page Name" and "Character Set Name" have been determined as follows:

| CODED FONT NAME | CODE PAGE NAME | CHARACTER SET NAME | GRID |
|---|---|---|---|
| — | T1D0BASE | C0S0CE12 | — |

Step 14. Assume that there is a member in the "Font Libraries" with member name "T1D0BASE". Processing will continue with Step 17.

Step 17. Assume that there is a member in the "Font Libraries" with member name "C0S0CE12". Processing will continue with Step 20.

Step 20. At this point, a "working" "Code Page Name" and "Character Set Name" have been determined which identify existing members in the supplied "Font Libraries". These members can be read to determine all required font data. The data is:

| CODED FONT NAME | CODE PAGE NAME | CHARACTER SET NAME | GRID |
|---|---|---|---|
| — | T1D0BASE | C0S0CE12 | — |

Example 3—A Coded Font Name with Font Substitution to a GRID Which Is Successfully Interpreted Step 2. After parsing the data from a single repeating group of a Map Coded Font (MCF) MO:DCA structure, the following data was identified:

| CODED FONT NAME | CODE PAGE NAME | CHARACTER SET NAME | GRID |
|---|---|---|---|
| X0PR15 | — | — | — |

Step 3. The data table entry #3 in the sample Font Substitution Table in FIG. 3 so the data is changed as shown below.

| CODED FONT NAME | CODE PAGE NAME | CHARACTER SET NAME | GRID |
|---|---|---|---|
| X0PR15 | — | — | 07E701F400550078 |

Step 4. The Code Page and Character Set Names are blank (or null), so continue to Step 5.

Step 5. The Coded Font Name is blank (or null), so continue to Step 6.

Step 6. Bytes 2–3 of the GRID (the CPGID) are "01F4" ("00500" in decimal). The CPGID matches the Table 2 entry identified in the Table 2 extracted below:

| | CODE PAGE ID (CPGID) | CODE PAGE NAME | GLOBAL CHAR SET ID (GCSID) | WRITING STYLE/ ALPHABET FLAG | |
|---|---|---|---|---|---|
| | 00424 | T1000424 | 00941 | H | |
| | 00437 | T1000437 | 00919 | 1 | |
| >>>> | 00500 | T1V10500 | 00697 | 1 | <<<< |
| | 00803 | T1000803 | 01147 | H | |
| | 00813 | T1000813 | 00925 | G | |

Therefore, the data will be changed as follows:

| CODED FONT NAME | CODE PAGE NAME | CHARACTER SET NAME | GRID |
|---|---|---|---|
| X0PR15 | T1V10500 | — | 07E701F400550078 | and the following temporary values will be saved:

| SAVED VALUES FROM STEP 6 | |
|---|---|
| GCSGID | Writing Style/Alphabet Flag |
| 0697 | 1 |

Step 7. Bytes 4–5 of the GRID (the FGID) are "0055" ("00085" in decimal). Bytes 6–7 of the GRID (the Average Character Width) are "0078" ("00120" in decimal). Bytes 0–1 of the GRID (the GCSGID) are "07E7" ("02023" in decimal). There are no Optional Modifiers. These data values match the Table 3 entry identified in the Table 3 extracted below:

| | FONT GLOBAL ID (FGID) | AVERAGE CHAR. WIDTH | GRAPHIC CHAR SET GLOBAL ID (GCSGID) | OPTIONAL FONT MODIFIERS | WRITING STYLE/ALPHA-BET FLAG | CHAR SET MEMBER NAME | |
|---|---|---|---|---|---|---|---|
| | 00084 | 00120 | | I | S | C0S0SYM0 | |
| | 00084 | 00120 | 02025 | | S | C0S0SR12 | |
| | 00085 | | | | 1 | C0S0CE12 | |
| | 00085 | | | | 1 | C0S0CR12 | |
| | 00085 | | | | 1 | C0E0CR12 | |
| | 00085 | | | | 2 | C0E0CREF | |
| | 00085 | | | | 2 | C0E0CREG | |
| | 00085 | | | | 2 | C0E0CREH | |
| | 00085 | | | | G | C0E0CREQ | |
| | 00085 | | | | S | C0S0SYM0 | |
| | 00085 | | | | S | C0E0CRER | |
| | 00085 | | | I | 1 | C0S0CI12 | |
| | 00085 | | | I | 1 | C0E0CI12 | |
| | 00085 | | | I | S | C0E0CIER | |
| | 00085 | | | B | 1 | C0S0CB12 | |
| | 00085 | | | B | S | C0E0CBER | |
| | 00085 | | 02023 | | | C0S0CR12 | |
| | 00085 | | 02023 | I | | C0S0CI12 | |
| | 00085 | | 02023 | B | | C0S0CB12 | |
| | 00085 | | 02036 | | | C0S0CE12 | |
| | 00085 | 00120 | | | 1 | C0S0CE12 | |
| | 00085 | 00120 | | | 1 | C0S0CR12 | |
| | 00085 | 00120 | | | 1 | C0E0CR12 | |
| | 00085 | 00120 | | | 2 | C0E0CREF | |
| | 00085 | 00120 | | | 2 | C0E0CREG | |
| | 00085 | 00120 | | | 2 | C0E0CREH | |
| | 00085 | 00120 | | | G | C0E0CREQ | |
| | 00085 | 00120 | | | S | C0S0SYM0 | |
| | 00085 | 00120 | | | S | C0E0CRER | |
| | 00085 | 00120 | | I | 1 | C0S0CI12 | |
| | 00085 | 00120 | | I | 1 | C0E0CI12 | |
| | 00085 | 00120 | | I | S | C0E0CIER | |
| | 00085 | 00120 | | B | 1 | C0S0CB12 | |
| | 00085 | 00120 | | B | S | C0E0CBER | |
| >>>> | 00085 | 00120 | 02023 | | | C0S0CR12 | <<<< |
| | 00085 | 00120 | 02023 | I | | C0S0CI12 | |
| | 00085 | 00120 | 02023 | B | | C0S0CB12 | |
| | 00085 | 00120 | 02036 | | | C0S0CE12 | |
| | 00086 | | | | 1 | C0S0PR12 | |
| | 00086 | | | | 1 | C0E0PR12 | |

Therefore, the data will be changed as follows:

| CODED FONT NAME | CODE PAGE NAME | CHARACTER SET NAME | GRID |
|---|---|---|---|
| X0PR15 | T1V10500 | C0S0CR12 | 07E701F400550078 | and processing will continue with Step 13.

Step 13. At this point, an "initial" "Code Page Name" and "Character Set Name" have been determined as follows:

| CODED FONT NAME | CODE PAGE NAME | CHARACTER SET NAME | GRID |
|---|---|---|---|
| X0PR15 | T1V10500 | C0S0CR12 | 07E701F400550078 |

Step 14. Assume that there is a member in the "Font Libraries" with member name "T1V10500". Processing will continue with Step 17.

Step 17. Assume that there is a member in the "Font Libraries" with member name "C0S0CR12". Processing will continue with Step 20.

Step 20. At this point, a "working" "Code Page Name" and "Character Set Name" have been determined which identify existing members in the supplied "Font Libraries". These members can be read to determine all required font data. The data is:

| CODED FONT NAME | CODE PAGE NAME | CHARACTER SET NAME | GRID |
|---|---|---|---|
| | T1V10500 | C0S0CR12 | |

Example 4—An Resolution of a GRID Which Is Successfully Interpreted via the Alternate Character Set Table Step 2. After parsing the data from a single repeating group of a Map Coded Font (MCF) MO:DCA structure, the following data was identified:

| CODED FONT NAME | CODE PAGE NAME | CHARACTER SET NAME | GRID |
|---|---|---|---|
| — | — | — | FFFF01F40055FFFF |

Step 3. The data does not match any entry in the sample Font Substitution Table in FIG. 3 so the data is not changed.

| CODED FONT NAME | CODE PAGE NAME | CHARACTER SET NAME | GRID |
|---|---|---|---|
| — | — | — | FFFF01F40055FFFF |

Step 4. The Code Page and Character Set Names are blank (or null), so continue to Step 5.

Step 5. The Coded Font Name is blank (or null), so continue to Step 6.

Step 6. Bytes 2–3 of the GRID (the CPGID) are "01F4" ("00500" in decimal). The CPGID matches the Table 2 entry identified in the Table 2 extracted below:

| | CODE PAGE ID (CPGID) | CODE PAGE NAME | GLOBAL CHAR SET ID (GCSGID) | WRITING STYLE/ ALPHABET FLAG | |
|---|---|---|---|---|---|
| | 00424 | T1000424 | 00941 | H | |
| | 00437 | T1000437 | 00919 | 1 | |
| >>>> | 00500 | T1V10500 | 00697 | 1 | <<<< |
| | 00803 | T1000803 | 01147 | H | |
| | 00813 | T1000813 | 00925 | G | |

Therefore, the data will be changed as follows:

| CODED FONT NAME | CODE PAGE NAME | CHARACTER SET NAME | GRID |
|---|---|---|---|
| — | T1V10500 | — | FFFF01F40055FFFF | and the following temporary values will be saved:

| SAVED VALUES FROM STEP 6 | |
|---|---|
| GCSGID | Writing Style/Alphabet Flag |
| 00697 | 1 |

Step 7. Bytes 0–1 of the GRID (the GCSGID) are the default indicator (X"FFFF"), so bypass this step.

Step 8. Bytes 0–1 of the GRID (the GCSGID) are the default indicator (X"FFFF"), so bypass this step.

Step 9. Bytes 4–5 of the GRID (the FGID) are "0055" ("00085" in decimal). Bytes 6–7 of the GRID (the Average Character Width) are the default indicator (X"FFFF"). The saved GCSGID from Step 6 is 00697 (decimal). The only Optional Modifier is "B" (bold). Based on these data values, there is no match against Table 3, so continue to Step 10.

Step 10. Bytes 4–5 of the GRID (the FGID) are "0055" ("00085" in decimal). Bytes 6–7 of the GRID (the Average Character Width) are the default indicator (X"FFFF"). The saved GCSGID from Step 6 is 00697 (decimal). Based on these data values, there is no match against Table 3, so continue to Step 11.

Step 11. Bytes 4–5 of the GRID (the FGID) are "0055" ("00085" in decimal). Bytes 6–7 of the GRID (the Average Character Width) are the default indicator (X"FFFF"), The saved Writing Style/Alphabet flag from Step 6 is "1". The only Optional Modifier is "B" (bold), These data values match the Table 3 entry identified in the Table 3 extracted below:

| | FONT GLOBAL ID (FGID) | AVERAGE CHAR. WIDTH | GRAPHIC CHAR SET GLOBAL ID (GCSGID) | OPTIONAL FONT MODIFIERS | WRITING STYLE/ALPHA-BET FLAG | CHAR SET MEMBER NAME | |
|---|---|---|---|---|---|---|---|
| | 00084 | 00120 | | I | S | C0S0SYM0 | |
| | 00084 | 00120 | 02025 | | | C0S0SR12 | |
| | 00085 | | | | 1 | C0S0CE12 | |
| | 00085 | | | | 1 | C0S0CR12 | |
| | 00085 | | | | 1 | C0E0CR12 | |
| | 00085 | | | | 2 | C0E0CREF | |
| | 00085 | | | | 2 | C0E0CREG | |
| | 00085 | | | | 2 | C0E0CREH | |
| | 00085 | | | | G | C0E0CREQ | |
| | 00085 | | | | S | C0S0SYM0 | |
| | 00085 | | | | S | C0E0CRER | |
| | 00085 | | | I | 1 | C0S0CI12 | |
| | 00085 | | | I | 1 | C0E0CI12 | |
| | 00085 | | | I | S | C0E0CIER | |
| >>>> | 00085 | | | B | 1 | C0S0CB12 | <<<< |
| | 00085 | | | B | S | C0E0CBER | |
| | 00085 | | 02023 | | | C0S0CR12 | |
| | 00085 | | 02023 | I | | C0S0CI12 | |

| FONT GLOBAL ID (FGID) | AVERAGE CHAR. WIDTH | GRAPHIC CHAR SET GLOBAL ID (GCSGID) | OPTIONAL FONT MODIFIERS | WRITING STYLE/ALPHA- BET FLAG | CHAR SET MEMBER NAME |
|---|---|---|---|---|---|
| 00085 |  | 02023 | B |  | C0S0CB12 |
| 00085 |  | 02036 |  |  | C0S0CE12 |
| 00085 | 00120 |  |  | 1 | C0S0CE12 |
| 00085 | 00120 |  |  | 1 | C0S0CR12 |
| 00085 | 00120 |  |  | 1 | C0E0CR12 |
| 00085 | 00120 |  |  | 2 | C0E0CREF |
| 00085 | 00120 |  |  | 2 | C0E0CREG |
| 00085 | 00120 |  |  | 2 | C0E0CREH |
| 00085 | 00120 |  |  | G | C0E0CREQ |
| 00085 | 00120 |  |  | S | C0S0SYM0 |
| 00085 | 00120 |  |  | S | C0E0CRER |
| 00085 | 00120 |  | I | 1 | C0S0CI12 |
| 00085 | 00120 |  | I | 1 | C0E0CI12 |
| 00085 | 00120 |  | I | S | C0E0CIER |
| 00085 | 00120 |  | B | 1 | C0S0CB12 |
| 00085 | 00120 |  | B | S | C0E0CBER |
| 00085 | 00120 | 02023 |  |  | C0S0CR12 |
| 00085 | 00120 | 02023 | I |  | C0S0CI12 |
| 00085 | 00120 | 02023 | B |  | C0S0CB12 |
| 00085 | 00120 | 02036 |  |  | C0S0CE12 |
| 00086 |  |  |  | 1 | C0S0PR12 |
| 00086 |  |  |  | 1 | C0E0PR12 |

Therefore, the data will be changed as follows:

| CODED FONT NAME | CODE PAGE NAME | CHARACTER SET NAME | GRID |
|---|---|---|---|
| — | T1V10500 | C0S0CB12 | FFFF01F40055FFFF | and processing will continue with Step 13.

Step 13. At this point, an "initial" "Code Page Name" and "Character Set Name" have been determined as follows:

| CODED FONT NAME | CODE PAGE NAME | CHARACTER SET NAME | GRID |
|---|---|---|---|
| — | T1V10500 | C0S0CB12 | FFFF01F40055FFFF |

Step 14. Assume that there is a member in the "Font Libraries" with member name "T1V10500". Processing will continue with Step 17.

Step 17. Assume that there is NOT a member in the "Font Libraries" with member name "C0S0CB12". Processing will continue with Step 18.

Step 18. The Character Set Name "C0S0CB12" matches the Table 5 entry identified in the Table 5 extracted below:

(a) Assume that there is NOT a member in the "Font Libraries" with member name "C0D0GB12". Processing will continue with the next "Alternate" Character Set Name.

(b) Assume that there is NOT a member in the "Font Libraries" with member name "C0D0SB12". Processing will continue with the next "Alternate" Character Set Name.

(c) Assume that there is NOT a member in the "Font Libraries" with member name "C0D0LB12". Processing will continue with the next "Alternate" Character Set Name.

(d) Assume that there is a member in the "Font Libraries" with member name "C0S0PB12". Therefore, the data will be changed as follows:

| CODED FONT NAME | CODE PAGE NAME | CHARACTER SET NAME | GRID |
|---|---|---|---|
| — | T1V10500 | C0S0PB12 | FFFF01F40055FFFF | and processing will continue with Step 20.

Step 20. At this point, a "working" "Code Page Name" and "Character Set Name" have been determined which identify existing members in the supplied "Font Libraries". These

| | PRIMARY CHARACTER SET NAME | ALT CHAR SET NAME #1 | ALT CHAR SET NAME #2 | ALT CHAR SET NAME #3 | ALT CHAR SET NAME #4 | ALT CHAR SET NAME #5 | ALT CHAR SET NAME #6 |
|---|---|---|---|---|---|---|---|
| | C0S0BRTR | C0D0GB12 | C0D0SB12 | C0S0CB12 | C0S0LB12 | C0S0PB12 | C0S0DOTR |
| | C0S0CB10 | C0D0GB10 | C0S0CR10 | | | | |
| >>>> | C0S0CB12 | C0D0GB12 | C0D0SB12 | C0S0LB12 | C0S0PB12 | C0S0BRTR | C0S0DOTR |
| | C0S0CB15 | C0S0CR15 | | | | | |
| | C0S0CD15 | C0S0CR15 | | | | | |

Step 19. Process the identified "Alternate" Character Set Names from the matched Table 5 entry in the order listed.

members can be read to determine all required font data. The data is:

| CODED FONT NAME | CODE PAGE NAME | CHARACTER SET NAME | GRID |
| --- | --- | --- | --- |
|  | T1V10500 | C0S0PB12 |  |

Example 5—A Resolution of a Code Page Name and Character Set Name Which Is Successfully Interpreted via the Alternate Code Page Table Step 2. After parsing the data from a single repeating group of a Map Coded Font (MCF) MO:DCA structure, the following data was identified:

| CODED FONT NAME | CODE PAGE NAME | CHARACTER SET NAME | GRID |
| --- | --- | --- | --- |
| — | T1L00CR1 | C0S0CE12 |  |

Step 3. The data does not match any entry in the sample Font Substitution Table in FIG. 3 so the data is not changed.

| CODED FONT NAME | CODE PAGE NAME | CHARACTER SET NAME | GRID |
| --- | --- | --- | --- |
| — | T1L00CR1 | C0S0CE12 |  |

Step 4. The Code Page and Character Set Names are present, so continue with Step 13.
Step 13. At this point, an "initial" "Code Page Name" and "Character Set Name" have been determined as follows:

| CODED FONT NAME | CODE PAGE NAME | CHARACTER SET NAME | GRID |
| --- | --- | --- | --- |
| — | T1L00CR1 | C0S0CE12 |  |

Step 14. Assume that there is NOT a member in the "Font Libraries" with member name "T1L00CR1". Processing will continue with Step 15.
Step 15. The Code Page Name "T1L00CR1" matches the Table 4 entry identified in the Table 4 extracted below:

|  | PRIMARY CODE PAGE NAME | ALT CODE PAGE NAME #1 | ALT CODE PAGE NAME #2 | ALT CODE PAGE NAME #3 |  |
| --- | --- | --- | --- | --- | --- |
|  | T1L00A11 | T1L00CR1 | T1000892 | T1V10500 |  |
|  | T1L02773 | T1000290 |  |  |  |
| >>>> | T1L00CR1 | T1000892 | T1V10500 | T1L00A11 | <<<< |
|  | T1L00CR3 | T1L0PCAN |  |  |  |
|  | T1L00CRB | T1000893 | T1V10500 |  |  |

Step 16. Process the identified "Alternate" Code Page Names from the matched Table 4 entry in the order listed.
 (a) Assume that there is NOT a member in the "Font Libraries" with member name "T1000892". Processing will continue with the next "Alternate" Code Page Name.
 (b) Assume that there is a member in the "Font Libraries" with member name "T1V10500". Therefore, the data will be changed as follows:

| CODED FONT NAME | CODE PAGE NAME | CHARACTER SET NAME | GRID |
| --- | --- | --- | --- |
| — | T1V10500 | C0S0CE12 |  | and processing will continue with Step 17.
Step 17. Assume that there is a member in the "Font Libraries" with member name "C0S0CE12". Processing will continue with Step 20.
Step 20. At this point, a "working" "Code Page Name" and "Character Set Name" have been determined which identify existing members in the supplied "Font Libraries". These members can be read to determine all required font data. The data is:

| CODED FONT NAME | CODE PAGE NAME | CHARACTER SET NAME | GRID |
| --- | --- | --- | --- |
|  | T1V10500 | C0S0CE12 |  |

Example 6—A Coded Font Name Which Is Not Resolvable

Step 2. After parsing the data from a single repeating group of a Map Coded Font (MCF) MO:DCA structure, the following data was identified:

| CODED FONT NAME | CODE PAGE NAME | CHARACTER SET NAME | GRID |
| --- | --- | --- | --- |
| X0GG10 | — | — |  |

Step 3. The data does not match any entry in the sample Font Substitution Table in FIG. 3 so the data is not changed.

| CODED FONT NAME | CODE PAGE NAME | CHARACTER SET NAME | GRID |
| --- | --- | --- | --- |
| X0GG10 | — | — |  |

Step 4. The Code Page and Character Set Names are blank (or null), so continue to Step 5.
Step 5. The Coded Font Name does NOT match any entry in Table 1. Assume that there is NOT a member in the "Font Libraries" with member name "X0GG10". Therefore, this MCF data is NOT resolvable.
The user's options to enable this MCF data to be resolved are:
 a) Code a Font Substitution Table entry for Coded Font Name "X0GG10"; or
 b) Add an entry to Table 1 for Coded Font Name "X0GG10"; or
 c) Add a Coded Font Member with member name "X0GG10" to the "Font Libraries".

Example 7—A Code Page Name Which Is Not Resolvable

Step 2. After parsing the data from a single repeating group of a Map Coded Font (MCF) MO:DCA structure, the following data was identified:

| CODED FONT NAME | CODE PAGE NAME | CHARACTER SET NAME | GRID |
|---|---|---|---|
| — | T1D0SPEC | C0S0CE12 | |

Step 3. The data does not match any entry in the sample Font Substitution Table in FIG. 3 so the data is not changed.

| CODED FONT NAME | CODE PAGE NAME | CHARACTER SET NAME | GRID |
|---|---|---|---|
| — | T1D0SPEC | C0S0CE12 | |

Step 4. The Code Page and Character Set Names are present, so continue with Step 13.
Step 13. At this point, an "initial" "Code Page Name" and "Character Set Name" have been determined as follows:

| CODED FONT NAME | CODE PAGE NAME | CHARACTER SET NAME | GRID |
|---|---|---|---|
| — | T1D0SPEC | C0S0CE12 | |

Step 14. Assume that there is NOT a member in the "Font Libraries" with member name "T1D0SPEC". Processing will continue with Step 15.
Step 15. The Code Page Name "T1D0SPEC" does NOT match any Table 4 entry. Therefore, this MCF data is NOT resolvable.
The user's options to enable this MCF data to be resolved are:

a) Code a Font Substitution Table entry for Code Page Name "T1D0SPEC" and Character Set Name "C0S0CE12"; or
b) Add a Code Page Member with member name "T1D0SPEC" to the "Font Libraries"; or
c) Add an entry to Table 4 for Code Page Name "T1D0SPEC" which specifies at least one "Alternate" Code Page Name which does exist in the "Font Libraries".

Example 8—A Character Set Name Which Is Not Resolvable

Step 2. After parsing the data from a single repeating group of a Map Coded Font (MCF) MO:DCA structure, the following data was identified:

| CODED FONT NAME | CODE PAGE NAME | CHARACTER SET NAME | GRID |
|---|---|---|---|
| — | T1D0BASE | C0S0CH10 | |

Step 3. The data does not match any entry in the sample Font Substitution Table in FIG. 3 so the data is not changed.

| CODED FONT NAME | CODE PAGE NAME | CHARACTER SET NAME | GRID |
|---|---|---|---|
| — | T1D0BASE | C0S0CH10 | |

Step 4. The Code Page and Character Set Names are present, so continue with Step 13.
Step 13. At this point, an "initial" "Code Page Name" and "Character Set Name" have been determined as follows:

| CODED FONT NAME | CODE PAGE NAME | CHARACTER SET NAME | GRID |
|---|---|---|---|
| — | T1D0BASE | C0S0CH10 | |

Step 14. Assume that there is a member in the "Font Libraries" with member name "T1D0BASE". Processing will continue with Step 17.
Step 17. Assume that there is NOT a member in the "Font Libraries" with member name "C0S0CH10". Processing will continue with Step 18.
Step 18. The Character Set Name "C0S0CH10" matches the Table 5 entry identified in the Table 5 extracted below:

| PRIMARY CHARACTER SET NAME | ALT CHAR SET NAME #1 | ALT CHAR SET NAME #2 | ALT CHAR SET NAME #3 | ALT CHAR SET NAME #4 | ALT CHAR SET NAME #5 | ALT CHAR SET NAME #6 |
|---|---|---|---|---|---|---|
| >>>> | C0S0CE10 C0S0CE12 C0S0CH10 C0S0CI10 C0S0CI12 | C0S0CR10 C0S0CR12 C0S0CO10 C0D0SI10 C0D0GI12 | C0D0GT10 C0S0CR10 C0S0PI12 | C0D0GR10 C0D0SI12 | C0D0RT10 C0S0EITR | C0D0ST10 C0S0CR12 | C0S0CR10 |

Step 19. Process the identified "Alternate" Character Set Names from the matched Table 5 entry in the order listed.
(a) Assume that there is NOT a member in the "Font Libraries" with member name "C0S0CO10". Therefore, this MCF data is NOT resolvable.

The user's options to enable this MCF data to be resolved are:

a) Code a Font Substitution Table entry for Code Page Name "T1D0BASE" and Character Set Name "C0S0CH10"; or
b) Add a Character Set Member with member name "C0S0CH10" to the "Font Libraries"; or
c) Update the Table 5 entry for Character Set Name "C0S0CH10" to specify at least one "Alternate" Character Set Name which does exist in the "Font Libraries".

Example 9—A GRID Which Can Not Be Resolved via Table 2

Step 2. After parsing the data from a single repeating group of a Map Coded Font (MCF) MO:DCA structure, the following data was identified:

| CODED FONT NAME | CODE PAGE NAME | CHARACTER SET NAME | GRID |
|---|---|---|---|
| — | — | — | FFFF01F90055FFFF |

Step 3. The data does not match any entry in the sample Font Substitution Table in FIG. 3 so the data is not changed.

| CODED FONT NAME | CODE PAGE NAME | CHARACTER SET NAME | GRID |
|---|---|---|---|
| — | — | — | FFFF01F90055FFFF |

Step 4. The Code Page and Character Set Names are blank (or null), so continue to Step 5.

Step 5. The Coded Font Name is blank (or null), so continue to Step 6.

Step 6. Bytes 2–3 of the GRID (the CPGID) are "01F9" ("00505" in decimal). The CPGID does NOT match any Table 2 entry. Therefore, this MCF data is NOT resolvable. The user's options to enable this MCF data to be resolved are:

a) Code a Font Substitution Table entry for GRID "FFFF01F90055FFFF"; or b) Add a Table 2 entry for CPGID "00505".

Example 10—A GRID Which Can Not Be Resolved via Table 3

Step 2. After parsing the data from a single repeating group of a Map Coded Font (MCF) MO:DCA structure, the following data was identified:

| CODED FONT NAME | CODE PAGE NAME | CHARACTER SET NAME | GRID |
|---|---|---|---|
| — | — | — | 02BC01F40009FFFF |

Step 3. The data does not match any entry in the sample Font Substitution Table in FIG. 3 so the data is not changed.

| CODED FONT NAME | CODE PAGE NAME | CHARACTER SET NAME | GRID |
|---|---|---|---|
| — | — | — | 02BC01F40009FFFF |

Step 4. The Code Page and Character Set Names are blank (or null), so continue to Step 5.

Step 5. The Coded Font Name is blank (or null), so continue to Step 6.

Step 6. Bytes 2–3 of the GRID (the CPGID) are "01F4" ("00500" in decimal). The CPGID matches the Table 2 entry identified in the Table 2 extracted below:

| | CODE PAGE ID (CPGID) | CODE PAGE NAME | GLOBAL CHAR SET ID (GCSGID) | WRITING STYLE/ ALPHABET FLAG | |
|---|---|---|---|---|---|
| | 00424 | T1000424 | 00941 | H | |
| | 00437 | T1000437 | 00919 | 1 | |
| >>>> | 00500 | T1V10500 | 00697 | 1 | <<<< |
| | 00803 | T1000803 | 01147 | H | |
| | 00813 | T1000813 | 00925 | G | |

Therefore, the data will be changed as follows:

| CODED FONT NAME | CODE PAGE NAME | CHARACTER SET NAME | GRID |
|---|---|---|---|
| — | T1V10500 | — | 02BC01F40009FFFF | and the following temporary values will be saved:

| SAVED VALUES FROM STEP 6 | |
|---|---|
| GCSGID | Writing Style/Alphabet Flag |
| 00697 | 1 |

Step 7. Bytes 4–5 of the GRID (the FGID) are "0009" ("00009" in decimal). Bytes 6–7 of the GRID (the Average Character Width) are the default indicator (X"FFFF"). Bytes 0–1 of the GRID (the GCSGID) are "02BC" ("00700" in decimal). The only Optional Modifier is "B" (bold). Based on these data values, there is no match against Table 3, so continue to Step 8.

Step 8. Bytes 4–5 of the GRID (the FGID) are "0009" ("00009" in decimal). Bytes 6–7 of the GRID (the Average Character Width) are the default indicator (X"FFFF"). Bytes 0–1 of the GRID (the GCSGID) are "02BC" ("00700" in decimal). Based on these data values, there is no match against Table 3, so continue to Step 9.

Step 9. Bytes 4–5 of the GRID (the FGID) are "0009" ("00009" in decimal). Bytes 6–7 of the GRID (the Average Character Width) are the default indicator (X"FFFF"). The saved GCSGID from Step 6 is 00697 (decimal). The only Optional Modifier is "B" (bold). Based on these data values, there is no match against Table 3, so continue to Step 10.

Step 10. Bytes 4–5 of the GRID (the FGID) are "0009" ("00009" in decimal). Bytes 6–7 of the GRID (the Average Character Width) are the default indicator (X"FFFF"). The saved GCSGID from Step 6 is 00697 (decimal). Based on these data values, there is no match against Table 3, so continue to Step 11.

Step 11. Bytes 4–5 of the GRID (the FGID) are "0009" ("00009" in decimal). Bytes 6–7 of the GRID (the Average Character Width) are the default indicator (X"FFFF"). The saved Writing Style/Alphabet flag from Step 6 is "1". The only Optional Modifier is "B" (bold). Based on these data values, there is no match against Table 3, so continue to Step 12.

Step 12. Bytes 4–5 of the GRID (the FGID) are "0009" ("00009" in decimal). Bytes 6–7 of the GRID (the Average Character Width) are the default indicator (X"FFFF"). The saved Writing Style/Alphabet flag from Step 6 is "1". Based on these data values, there is no match against Table 3. Therefore, this MCF data is NOT resolvable.

The user's options to enable this MCF data to be resolved are:

a) Code a Font Substitution Table entry for GRID "02BC01F90009FFFF"; or b) Add a Table 3 entry for FGID "00009" which will cause this MCF data to successfully match Table 3 in Steps 7, 8, 9, 10, 11, or 12.

The resulting Font resolution method enables a user to customize the transformation of fonts defined in a mixed object document content architecture into fonts which the user has available on his local system for printing and display.

Although a specific embodiment of the invention has been disclosed, it will be understood by those having skill in the art that changes can be made to that specific embodiment without departing from the spirit and the scope of the invention.

What is claimed is:

1. In a data processing system, a method for font resolution between a first defined font in a document architecture and a second available font within the data processing system, comprising the steps of:

loading data interpretation tables into the data processing system;

loading a Font Substitution Table into the data processing system;

loading a locally available Font Library into the data processing system;

loading a source document which includes a map coded font structure into the data processing system;

getting said map coded font structure and parsing it in the data processing system;

matching parsed names extracted from said map coded font structure against said Font Substitution Table;

generating an initial Code Page Name and an initial Character Set Name from said Font Substitution Table;

searching said Font Library for a working Code Page Name and a working Character Set Name;

printing said document using said working Code Page Name and said working Character Set Name on a printer in said data processing system;

if said step of matching parsed names against said Font Substitution Table fails to generate an initial Code Page Name and an initial Character Set Name, the method further comprises the steps of:

matching said parsed names against said data interpretation tables;

generating an initial Code Page name and initial Character Set Name from said data interpretation tables;

searching said Font Library for a working Code Page Name and a working Character Set Name;

outputting said working Code Page Name and said working Character Set Name derived from said data interpretation tables to print and display said document in said data processing system.

2. The method of claim 1 which further comprises:

if said step of parsing said names against said data interpretation tables fails to generate an initial Code Page Name and an initial Character Set Name, the method further comprising the steps of:

looking up an alternate Code Page name and an alternate Character Set Name in said data interpretation tables:

searching for said alternate Code Page Name and said Alternate Character Set Name in said Font Library;

outputting a working Code Page Name and a working Character Set Name to print and display said document on said printer and said display in said data processing system.

* * * * *